United States Patent
Cook

(10) Patent No.: US 10,422,666 B2
(45) Date of Patent: Sep. 24, 2019

(54) ELECTRONIC POSITION ENCODER AND METHOD FOR REDUCING SHORT RANGE ERRORS

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 251 days.

(21) Appl. No.: 15/389,911

(22) Filed: Dec. 23, 2016

(65) Prior Publication Data

US 2018/0180452 A1    Jun. 28, 2018

(51) Int. Cl.
G01R 27/26    (2006.01)
G01D 5/347    (2006.01)
G01D 5/20    (2006.01)

(52) U.S. Cl.
CPC ....... G01D 5/34746 (2013.01); G01D 5/2086 (2013.01); G01D 5/34792 (2013.01)

(58) Field of Classification Search
USPC .......... 324/658, 660–663, 667, 671
See application file for complete search history.

(56) References Cited

U.S. PATENT DOCUMENTS

| | | | |
|---|---|---|---|
| 3,882,482 A | 5/1975 | Green et al. | |
| 4,109,389 A | 8/1978 | Balcom et al. | |
| 4,414,754 A | 11/1983 | Lapeyre | |
| 4,964,727 A | 10/1990 | Huggins | |
| 5,010,655 A | 4/1991 | Rieder et al. | |
| 5,237,391 A | 8/1993 | Huggins | |
| 5,279,044 A | 1/1994 | Bremer | |
| 5,442,166 A | 8/1995 | Hollmann | |
| 5,731,707 A * | 3/1998 | Andermo | G01D 5/2415 324/660 |
| 5,773,820 A | 6/1998 | Osajda et al. | |
| 5,841,274 A | 11/1998 | Masreliez et al. | |
| 5,886,519 A | 3/1999 | Masreliez et al. | |
| 5,894,678 A | 4/1999 | Masreliez et al. | |
| 5,965,879 A | 10/1999 | Leviton | |
| 5,973,494 A | 10/1999 | Masreliez et al. | |

(Continued)

OTHER PUBLICATIONS

Cook, "Absolute Position Encoder Including a Redundant Spatial Phase Signal," U.S. Appl. No. 14/871,386, filed Sep. 30, 2015, 45 pages.

*Primary Examiner* — Vincent Q Nguyen
(74) *Attorney, Agent, or Firm* — Seed IP Law Group LLP

(57) ABSTRACT

An electronic position encoder comprises a scale including a periodic scale pattern along a measuring axis direction having a scale period Ps, and a detector portion comprising a first group of sensing elements, a second group of sensing elements, and a signal processing configuration. The second group of sensing elements is located at a group position which is equal to K2*Ps+PS/M relative to the first group of sensing elements along the measuring axis direction, where K2 and M are integers. The signal processing configuration independently acquires a first set of detector signals from the first group of sensing elements, and a second set of detector signals from the second group of sensing elements, and determines a relative position between the detector portion and the scale pattern based on the first set of detector signals and the second set of detector signals.

10 Claims, 6 Drawing Sheets

(56) References Cited

U.S. PATENT DOCUMENTS

| | | |
|---|---|---|
| 5,998,990 A | 12/1999 | Andermo et al. |
| 6,002,250 A | 12/1999 | Masreliez et al. |
| 6,005,387 A | 12/1999 | Andermo et al. |
| 6,011,389 A | 1/2000 | Masreliez et al. |
| 6,329,813 B1 | 12/2001 | Andermo |
| 6,400,138 B1 | 6/2002 | Andermo |
| 6,487,787 B1 | 12/2002 | Nahum et al. |
| 8,309,906 B2 | 11/2012 | Kapner et al. |
| 2015/0153205 A1* | 6/2015 | Uozumi ............ G01D 5/24476 318/640 |

* cited by examiner

ELECTRONIC POSITION ENCODER AND METHOD FOR REDUCING SHORT RANGE ERRORS

BACKGROUND

Technical Field

The invention relates generally to precision measurement instruments, and particularly to electronic position encoders.

Description of the Related Art

Various optical, capacitive, magnetic and inductive transducers, and movement or position transducers are available. These transducers use various geometric configurations of a transmitter and a receiver in a read head to measure movement between the read head and a scale. Inductive sensors are known to be one of the sensor types that is most immune to contamination by particles, oil, water, and other fluids. U.S. Pat. No. 6,011,389 (the '389 patent), which is hereby incorporated herein by reference in its entirety, describes an induced current position transducer usable in high accuracy applications. U.S. Pat. Nos. 5,973,494 and 6,002,250, which are each hereby incorporated herein by reference in their entireties, describe incremental position inductive calipers and linear scales, including signal generating and processing circuits. U.S. Pat. Nos. 5,886,519; 5,841,274; 5,894,678; 6,400,138; and 8,309,906, which are each hereby incorporated herein by reference in their entireties, describe absolute position inductive calipers and electronic tape measures using the induced current transducer. As described in these patents, the induced current transducer may be readily manufactured using known printed circuit board technology.

Different implementations of the induced current transducer (and other types of transducers) may be implemented as either incremental or absolute position encoders. In general, incremental position encoders utilize a scale that allows the displacement of a read head relative to a scale to be determined by accumulating incremental units of displacement, starting from an initial point along the scale. However, in certain applications such as those where encoders are used in low power consumption devices, it is more desirable to use absolute position encoders. Absolute position encoders provide a unique output signal, or combination of signals, at each position (of a read head) along a scale. They do not require continuous accumulation of incremental displacements in order to identify a position. Thus, absolute position encoders allow various power conservation schemes, amongst other advantages. In addition to the patents referenced above, U.S. Pat. Nos. 3,882,482; 5,965,879; 5,279,044; 5,237,391; 5,442,166; 4,964,727; 4,414,754; 4,109,389; 5,773,820; and 5,010,655 disclose various encoder configurations and/or signal processing techniques relevant to absolute encoders, and are each hereby incorporated herein by reference in their entirety.

The terms "track" or "scale track" as used herein generally refer to a region of the scale or scale pattern that extends along the measuring axis direction and has an approximately constant width and location along the direction transverse to the measuring axis. A scale track generally underlies and is aligned with a particular set of detectors that is guided along the measuring axis direction. The detectors respond to a pattern of scale element(s) in the underlying scale track to generate position signals that depend on the detector position along the track.

Various techniques are known for reducing short range measurement errors in electronic position encoders. For example, U.S. Pat. No. 6,329,813 discloses twisted magnetic flux coupling loops in an inductive encoder which reduce errors from signal offset and undesired even harmonics. U.S. Pat. No. 6,005,387 (the '387 patent) discloses a three phase encoder which suppresses errors from harmonics which are a multiple of three (e.g., third and sixth harmonics). U.S. Pat. No. 5,886,519 discloses a four phase encoder which suppresses errors from even harmonics and signal offset. U.S. Pat. No. 5,998,990 (the '990 patent) discloses pitch compensation in a detector layout which reduces amplitude mismatch. U.S. Pat. No. 6,487,787 discloses corrections to offset, amplitude and phase of quadrature signals which may also reduce short range errors. However, these systems are still vulnerable to errors from higher harmonics, such as fifth and seventh harmonics. Furthermore, pitch compensation is difficult to apply to a compact read head because of manufacturing limitations. Residual amplitude or offset mismatch from preamplifier components may persist in systems which calibrate for errors from temperature drift and other factors in read head integrated circuits. Applying compensation factors for offset, amplitude and phase variations is typically applied as an average for a product line rather than for an individual system which may have different variations. Configurations for electronic position encoders that provide improved robustness to these errors would be desirable.

BRIEF SUMMARY

This summary is provided to introduce a selection of concepts in a simplified form that are further described below in the Detailed Description. The summary is not intended to identify key features of the claimed subject matter, nor is it intended to be used as an aid in determining the scope of the claimed subject matter.

An electronic position encoder is disclosed which is usable to measure a relative position between two elements along a measuring axis direction that coincides with a measuring axis direction. The electronic position encoder comprises a scale and a detector portion. The scale extends along the measuring axis direction and includes a periodic scale pattern along the measuring axis direction having a scale period Ps. The detector portion is configured to be mounted proximate to the scale pattern and to move along the measuring axis direction relative to the scale pattern. The detector portion comprises a plurality of sensing elements and a signal processing configuration. The plurality of sensing elements are arranged along the measuring axis direction and are configured to provide detector signals which correspond to the relative position between the detector portion and the scale pattern. The signal processing configuration is operably connected to the detector portion and determines the relative position between the detector portion and the scale pattern based on detector signals input from the detector portion. The plurality of sensing elements comprises at least a first group of sensing elements and a second group of sensing elements. The first group of sensing elements comprises N sensing elements arranged at N equally spaced phases of the scale period Ps. The second group of sensing elements comprises N sensing elements arranged at N equally spaced phases of the scale period Ps. The second group of sensing elements is located at a group position which is equal to K2*Ps+Ps/M relative to the first set of sensing elements along the measuring axis direction, where K2 and M are integers. The signal processing configuration is configured to independently acquire a first set of detector signals from the first group of sensing elements and a second set of detector signals from the second group of sensing elements and determine the relative position between the detector portion and the scale pattern based on the first set of detector signals and the second set of detector signals.

A method is disclosed for reducing short range errors in determining a relative position measurement of a scale pattern relative to a detector portion along a measuring axis direction as measured by an electronic position encoder, and the detector portion comprising a signal processing portion. The method comprises:

operating the detector portion to measure a first spatial phase using a first group of sensing elements comprising N sensing elements arranged at equally spaced phases of a scale period Ps of the scale pattern at a first group position on the detector portion;

operating the detector portion to measure a second spatial phase using a second group of sensing elements comprising N sensing elements arranged at equally spaced phases of a scale period Ps of the scale pattern at a second group position on the detector portion which is offset along the measuring axis direction on the detector portion by K2*Ps+Ps/M relative to the first group position, where K2 and M are an integers; and operating the signal processing portion to determine the relative position between the scale pattern and the detector portion along the measuring axis direction based on a combination of the first and second spatial phases.

It should be appreciated that typical three phase and four phase encoders apply error corrections and compensation to detector signals before a position is calculated, whereas the principles disclosed herein for reducing errors are applied after multiple positions are calculated using three phase, four phase and similar position calculation techniques.

DETAILED DESCRIPTION

Figure 1:
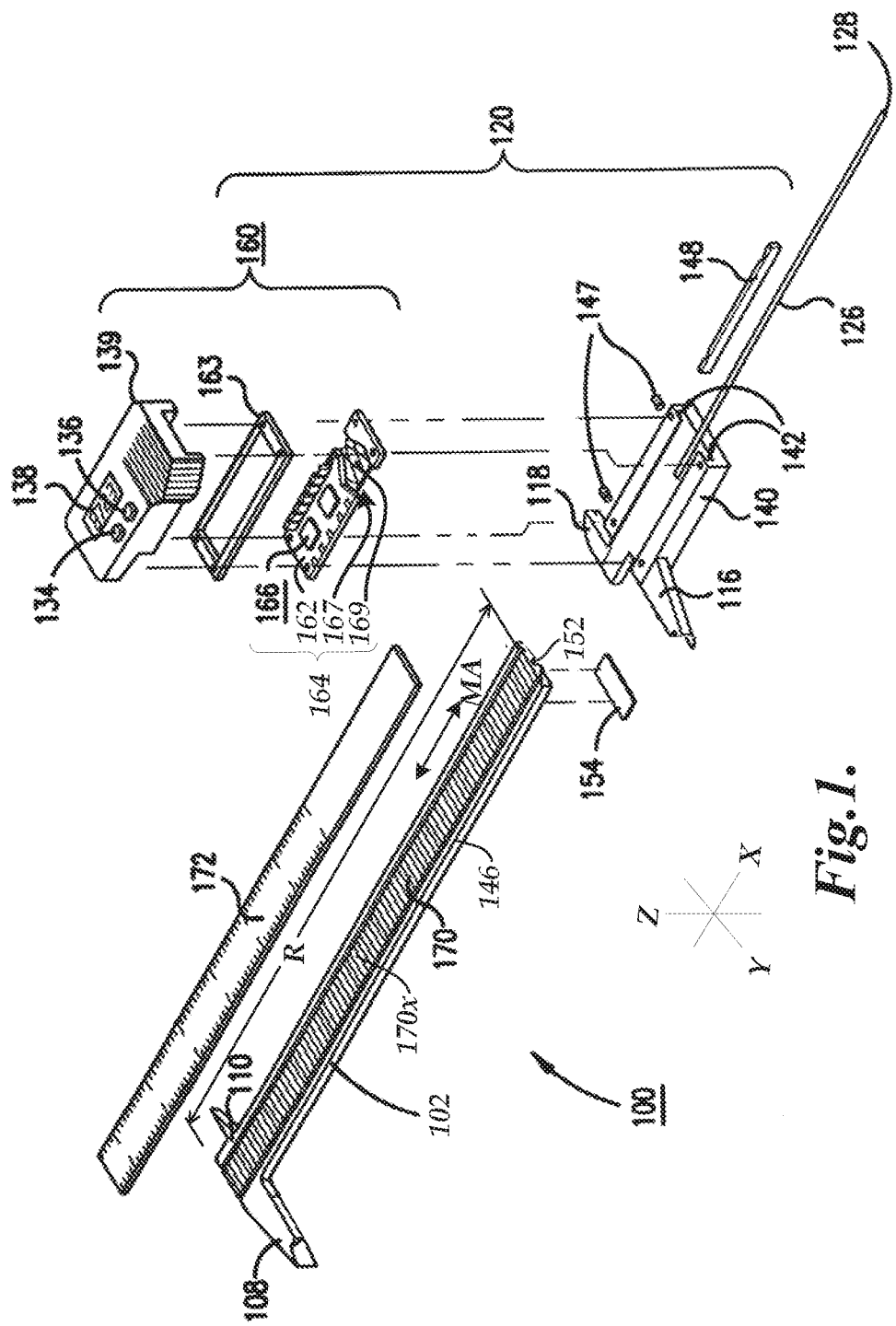
FIG. 1 is an exploded isometric view diagram of a hand tool caliper, which is one exemplary application for an encoder according to an embodiment of the present invention.

FIG. 1 is an exploded isometric view diagram of a hand tool type caliper 100 including a scale member 102 having a spar of roughly rectangular cross-section including a scale 170, and slider assembly 120. FIG. 1 illustrates X-Y-Z coordinate axes, for reference. The measuring axis direction is parallel to the X axis. The operation of such calipers is generally known, and the caliper 100 is only briefly described here, in order to indicate some exemplary practical requirements that create various problems and/or design constraints which are desirably solved by an encoder design such as that disclosed herein. As shown in FIG. 1, the scale 170 may include a signal modulating scale pattern 170x (represented schematically) extending along the measuring axis direction MA (the X axis). The variable suffix "x" is replaced by different letters herein to designate different corresponding signal modulating scale patterns. The signal modulating scale pattern 170x may be of an absolute type that defines a corresponding absolute range R along the measuring axis direction, as described in greater detail below. In many commercial calipers the signal modulating scale pattern 170x is be formed on a printed circuit board which is bonded in place. A known type of cover layer 172 (e.g., 100 µm thick) may cover the scale 170. Fixed jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. A depth bar engagement end 128 may extend into a hole to measure its depth. A cover 139 of the slider assembly 120 may include on/off switch 134 and zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to ensure proper alignment for measuring, and for moving a read head portion 164 relative to the scale 170.

A pickoff assembly 160 mounted on the base 140 holds the read head portion 164 which in this embodiment includes substrate 162 (e.g., a printed circuit board) that carries a sensing portion or detector 167 (e.g., a field generating and sensing winding configuration) which comprises sensing elements 169, and a signal processing and control circuit 166. In the present description, the terms "sensing portion" and "detector" are often used interchangeably, unless otherwise indicated by description or context. A resilient seal 163 may be compressed between the cover 139 and the substrate 162 to exclude contamination from the circuitry and connections. The sensing portion 167 may be covered by an insulative coating. In one specific illustrative example the sensing portion 167 may be arranged parallel with and facing the scale 170 separated by a gap on the order of 0.5 mm along the depth (Z) direction. Together, the read head portion 164 and the scale 170 may form a transducer (e.g., an inductive or eddy current transducer which operates by generating changing magnetic fields).

Figure 2A:
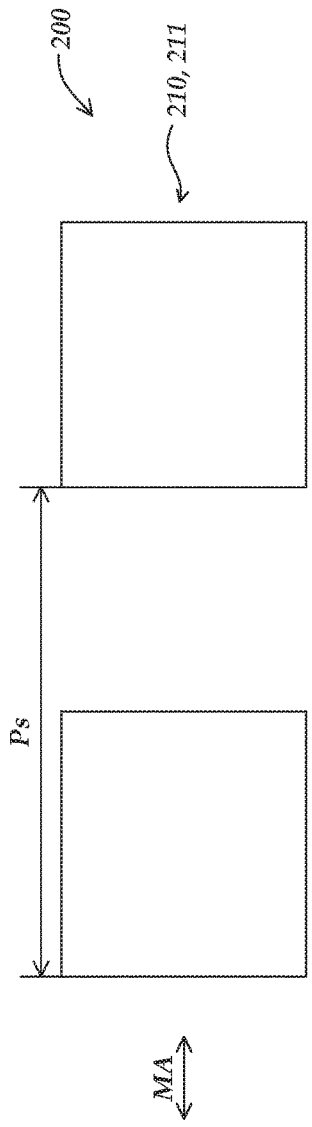
FIG. 2A is a schematic diagram of a portion of a scale that may be used in an electronic position encoder.

FIG. 2A is a schematic diagram of a portion of a scale 210 that may be used in an electronic position encoder 200 and which may be incorporated as a transducer into a measurement system such as the caliper 100. The electronic position encoder 200 is usable to measure a relative position between two elements along a measuring axis direction MA. The scale 210 extends along the measuring axis direction and includes a periodic scale pattern 211 along the measuring axis direction MA and has a scale period Ps. In some implementations, the periodic scale pattern 211 may include magnetic flux coupling loops which spatially modulate an alternating magnetic flux along the measuring axis direction MA. Alternatively, the scale pattern may comprise metal plates in a read head configured for an eddy transducer, or chrome elements on a glass substrate for an optical encoder. For simplicity, the scale pattern 211 is shown as a periodic pattern of rectangular components located at a scale period Ps.

Figure 2B:
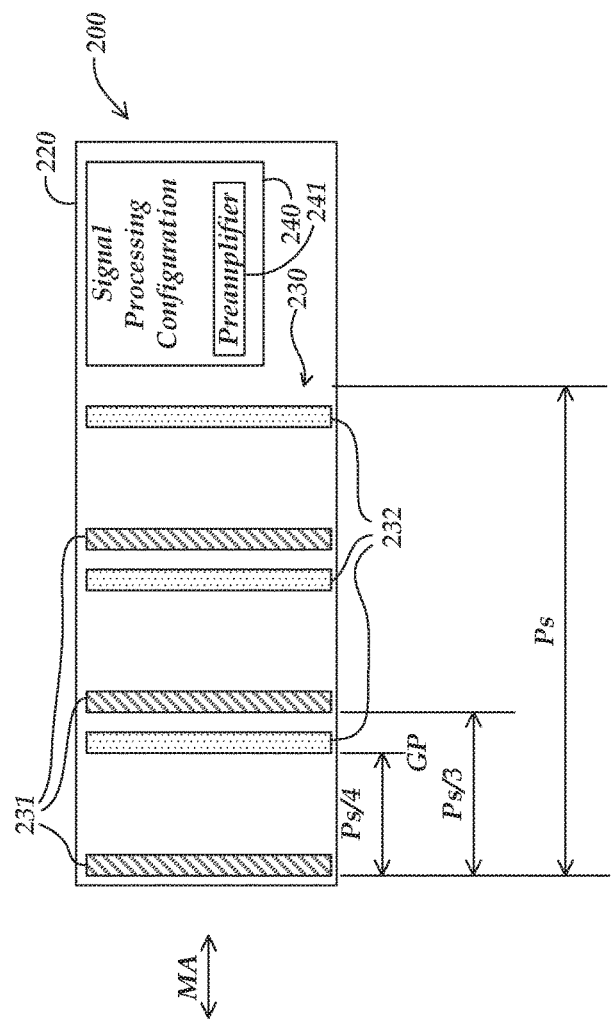
FIG. 2B is a schematic diagram of a detector portion that may be used in conjunction with the scale of FIG. 2A.

FIG. 2B is a schematic diagram of a detector portion 220 that may be used in conjunction with the scale 210 of FIG. 2A in the electronic position encoder 200. The detector portion 220 is configured to be mounted proximate to the scale pattern 211 and to move along the measuring axis direction MA relative to the scale pattern 211. The detector portion 220 comprises sensing elements 230 and a signal processing configuration 240. The sensing elements 230 are arranged along the measuring axis direction MA and configured to provide detector signals which correspond to the relative position between the detector portion 220 and the scale pattern 211. The sensing elements 230 are shown as thin rectangles for simplicity, in order to demonstrate spatial relationships. It should be appreciated that more realistic sensing elements may employ more complex electromagnetic loops or other suitable structures for measuring the relative position. The signal processing configuration 240 is operably connected to the detector portion and determines the relative position between the detector portion 220 and the scale pattern 211 based on detector signals input from the detector portion 220. The sensing elements 230 comprise a first set of sensing elements 231 and a second set of sensing elements 232. The first set of sensing elements 231 comprises three sensing elements arranged at three equally spaced phases of the scale period Ps. The second set of sensing elements 232 comprises three sensing elements arranged at three equally spaced phases of the scale period Ps. The second set of sensing elements 232 is located at a group position GP which is displaced at a distance equal to Ps/4 relative to the first set of sensing elements 231 along the measuring axis direction MA. The signal processing configuration 240 is configured to independently acquire a first set of detector signals from the first set of sensing elements 231 and the second set of detector signals from the second set of sensing elements 232 and determine the relative position between the detector portion 220 and the scale pattern 211 based on the first set of detector signals and the second set of detector signals.

In some implementations, the electronic position encoder 200 may be an absolute electronic position encoder comprising multiple scale tracks. The scale pattern 211 may be an incremental track coupled with at least one additional tracks to determine an absolute position.

In some implementations, the signal processing configuration 240 may comprise a preamplifier 241 configured to receive multiplexed position signals from both the first set of sensing elements 231 and the second set of sensing elements 232. This may ensure offset and amplitude errors from the amplifiers are common-mode to both the first set of sensing elements 231 and the second set of sensing elements 232.

In some implementations, the electronic position encoder 200 may further comprise a first electronic connection between the first set of sensing elements 231 and the signal processing configuration 240, and a second electronic connection between the second set of sensing elements 231 and the signal processing configuration 240, and the first electronic connection and the second electronic connection may be symmetric relative to one another. This may provide optimal suppression of errors from offset mismatch.

Figure 2C:
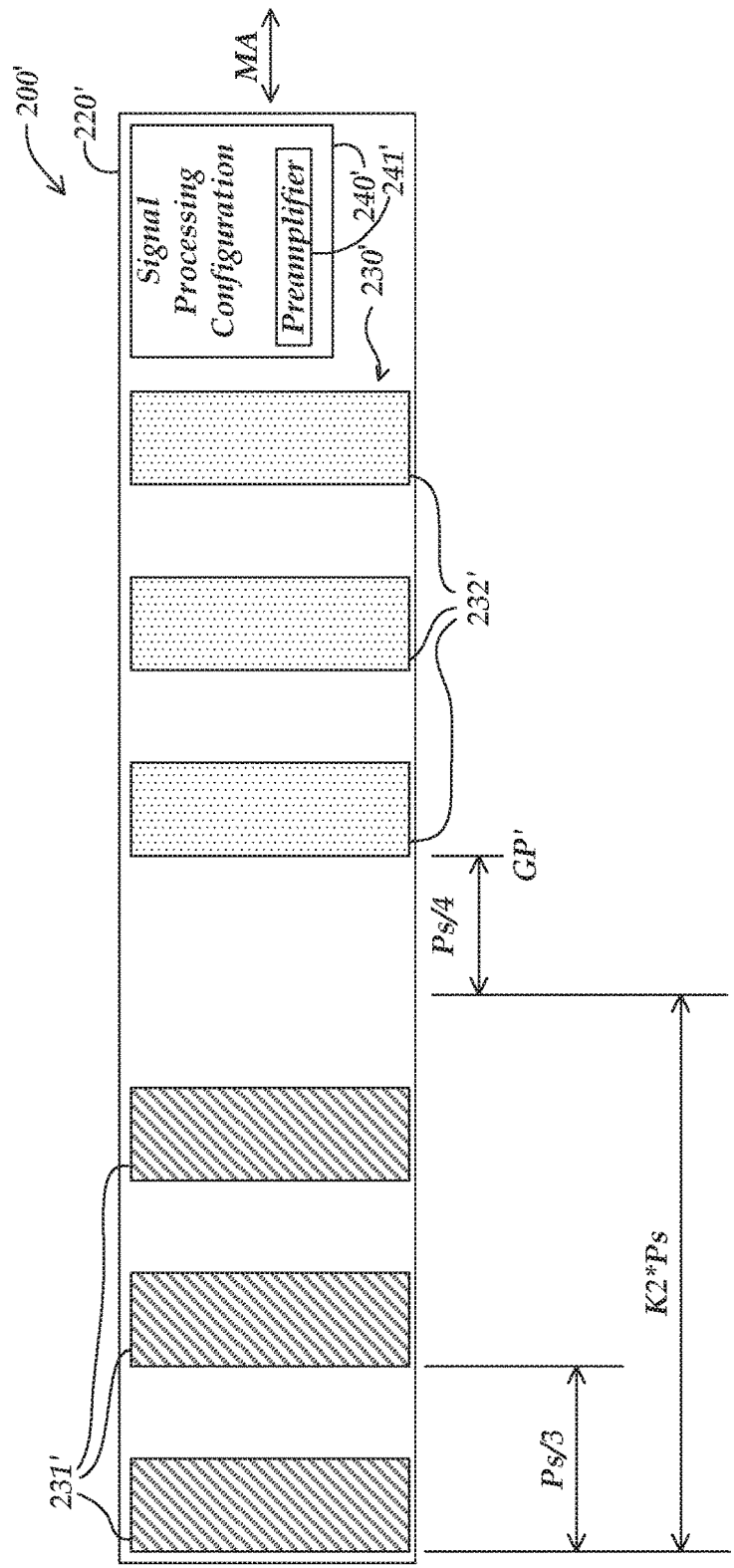
FIG. 2C is a schematic diagram of a generalized detector portion which may be used in an electronic position encoder.

Various alternatives to the implementation shown in FIG. 2A and FIG. 2B may be used according to the principles disclosed herein. FIG. 2C is a schematic diagram of a generalized detector portion 220' which may be used in an electronic position encoder. The detector portion 220 of FIG. 2B shows the first set of sensing elements 231 and the second set of sensing elements 232 in an interleaved arrangement. However, alternative arrangements are possible. FIG. 2C shows similar elements marked as 2XX' which are similar to elements 2XX in FIG. 2A and FIG. 2B. As shown in FIG. 2C, sensing elements 230' comprise a first set of sensing elements 231' and a second set of sensing elements 232'. The second group of sensing elements 232' is located at a group position GP' which is equal to K2*Ps+Ps/4 relative to the first group of sensing elements 231' along the measuring axis direction MA.

In general, an electronic position encoder configured according to the principles disclosed herein comprises a scale and a detector portion. The scale extends along the measuring axis direction and includes a periodic scale pattern along the measuring axis direction having a scale period Ps. The detector portion is configured to be mounted proximate to the scale pattern and to move along the measuring axis direction relative to the scale pattern. The detector portion comprises a plurality of sensing elements and a signal processing configuration. The plurality of sensing elements is arranged along the measuring axis direction and is configured to provide detector signals which correspond to the relative position between the detector portion and the scale pattern. The signal processing configuration is operably connected to the detector portion and determines the relative position between the detector portion and the scale pattern based on detector signals input from the detector portion. The plurality of sensing elements comprises at least a first group of sensing elements and a second group of sensing elements. The first group of sensing elements comprises N sensing elements arranged at N equally spaced phases of the scale period Ps. The second group of sensing elements comprises N sensing elements arranged at N equally spaced phases of the scale period Ps. The second group of sensing elements is located at a group position which is equal to K2*Ps+Ps/M relative to the first set of sensing elements along the measuring axis direction, where K2 and M are integers. The signal processing configuration is configured to independently acquire a first set of detector signals from the first group of sensing elements and a second set of detector signals from the second group of sensing elements and determine the relative position between the detector portion and the scale pattern based on the first set of detector signals and the second set of detector signals.

In some implementations, M may be one of 2, 3 or 4.

It should be appreciated that the example shown in FIGS. 2B and 2C show a first set of sensing elements and a second set of sensing elements with distinct sensing elements. In some alternative implementations, the first set of sensing elements and the second set of sensing elements may share at least one common sensing element. This arrangement requires fewer sensing elements. The first set of sensing elements and the second set of sensing elements may be configured to provide multiplexed signals to a signal processing configuration. In some implementations, M may be equal to 3 and N may be equal to 3. Such an implementation requires a minimum of seven sensors, as opposed to nine sensors in the absence of common sensing elements.

Figure 3A:
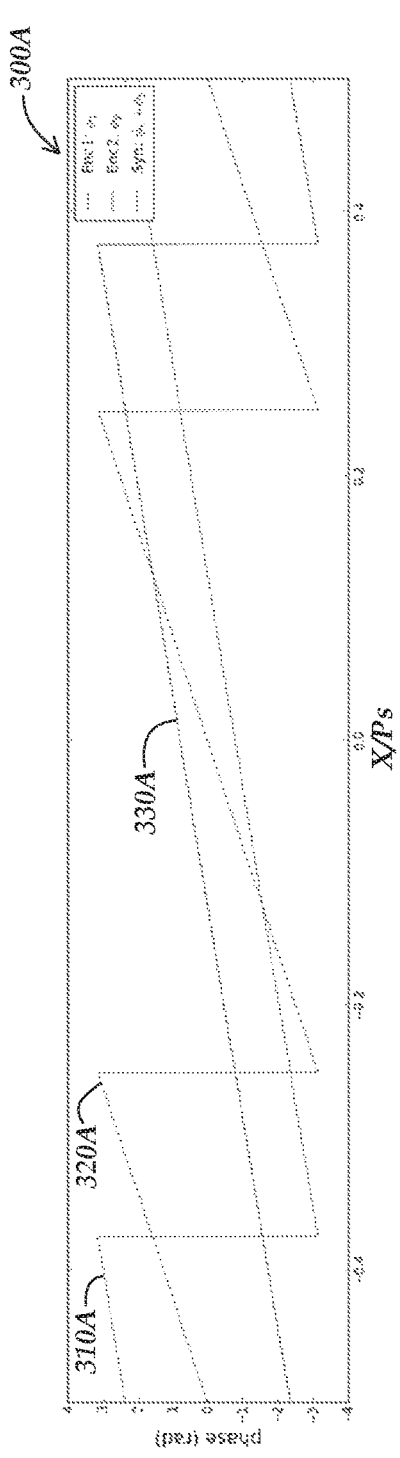
FIG. 3A shows a graph of a first phase, a second phase, and a synthetic phase as a functions of a position X along a measuring axis direction as measured by an electronic position encoder.

FIG. 3A shows a graph 300A of a first spatial phase 310A, a second spatial phase 320A, and a synthetic spatial phase 330A as functions of a position X/Ps along a measuring axis direction as measured by an electronic position encoder arranged in a similar manner to the electronic position encoder 200, shown in units of radians. In some implementations, the signal processing configuration 240 may be configured to determine the first spatial phase 310A of the periodic scale pattern 211 relative to the first set of sensing elements 231 based on the first set of detector signals, determine the second spatial phase 320A of the periodic scale pattern 211 relative to the second set of sensing elements 232 based on the second set of detector signals, and determine the relative position X between the detector portion 220 and the scale pattern 211 based on the synthetic spatial phase 330A which is a sum of the first phase 310A and second phase 320A. It should be appreciated that as shown in FIG. 3A, the synthetic phase 330A has a period of Ps/2 along the measuring axis direction. The signal processing configuration 240 determines the relative position between the detector portion 220 and the scale pattern 211 by multiplying the synthetic phase 330A by the period of the synthetic phase 330A, which is Ps/2.

Figure 3B:
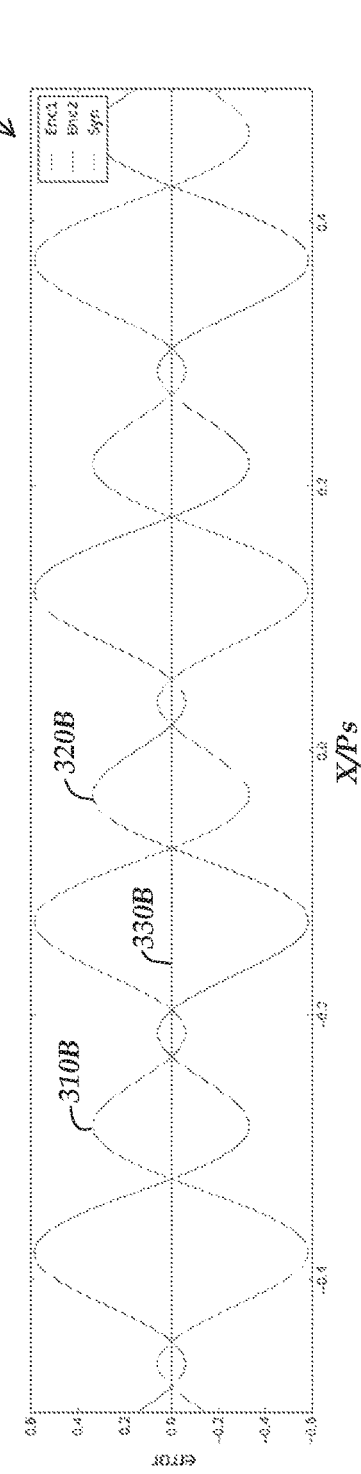
FIG. 3B shows a graph of a first error component contribution, a second error component contribution, and a summed error contribution as functions of the position X of FIG. 3A.

FIG. 3B shows a graph 300B of a first error component contribution 310B, a second error component contribution 320B, and a summed error component contribution 330B as functions of the position X/Ps of FIG. 3A, shown in units of percentage of the scale period Ps. The first error component contribution 310B is an error in the first spatial phase 310A, and the second error component contribution 320B is an error in the second spatial phase 320A. The first error component contribution 310B and the second error component contribution 320B are the result of amplitude mismatch, phase mismatch, a fifth harmonic in the detector signals, and a seventh harmonic in the detector signals. As shown in the graph 300B, the first error component contribution 310B and the second error component contribution 320B are equal in magnitude and opposite in sign for each value of the position X because the second set of sensing elements 232 is located at a group position GP which is displaced at a distance equal to Ps/4 relative to the first set of sensing elements 231 along the measuring axis direction MA. Therefore, because the synthetic spatial phase 330A is a sum of the first spatial phase 310A and the second spatial phase 320A, the summed error component contribution 330B is zero for each value of the position X.

The design of various elements of scales and detectors in an inductive caliper may be understood through commonly assigned U.S. patent application Ser. No. 14/871,386 which is hereby incorporated by reference in entirety. A similar caliper or one constructed according to the design of known commercially available inductive calipers may give rise to errors similar to those shown in FIG. 3B. In such systems employing a single set of three sensing elements a typical error in a three phase measurement using a 5.4 mm scale period Ps may have a peak to peak value of 18.3 microns, including a short range error of approximately 12 microns. In some implementations, a detector portion configured similarly to the detector portion 220 with two sets of three sensing elements may reduce this error to a peak to peak value of 11.1 microns, including a reduced short range error of approximately 5 microns. In some implementations, a detector portion configured with four sets of three sensing elements may reduce this error to a peak value of 6.1 microns, including a reduced short range error of approximately 1 micron.

Figure 4:
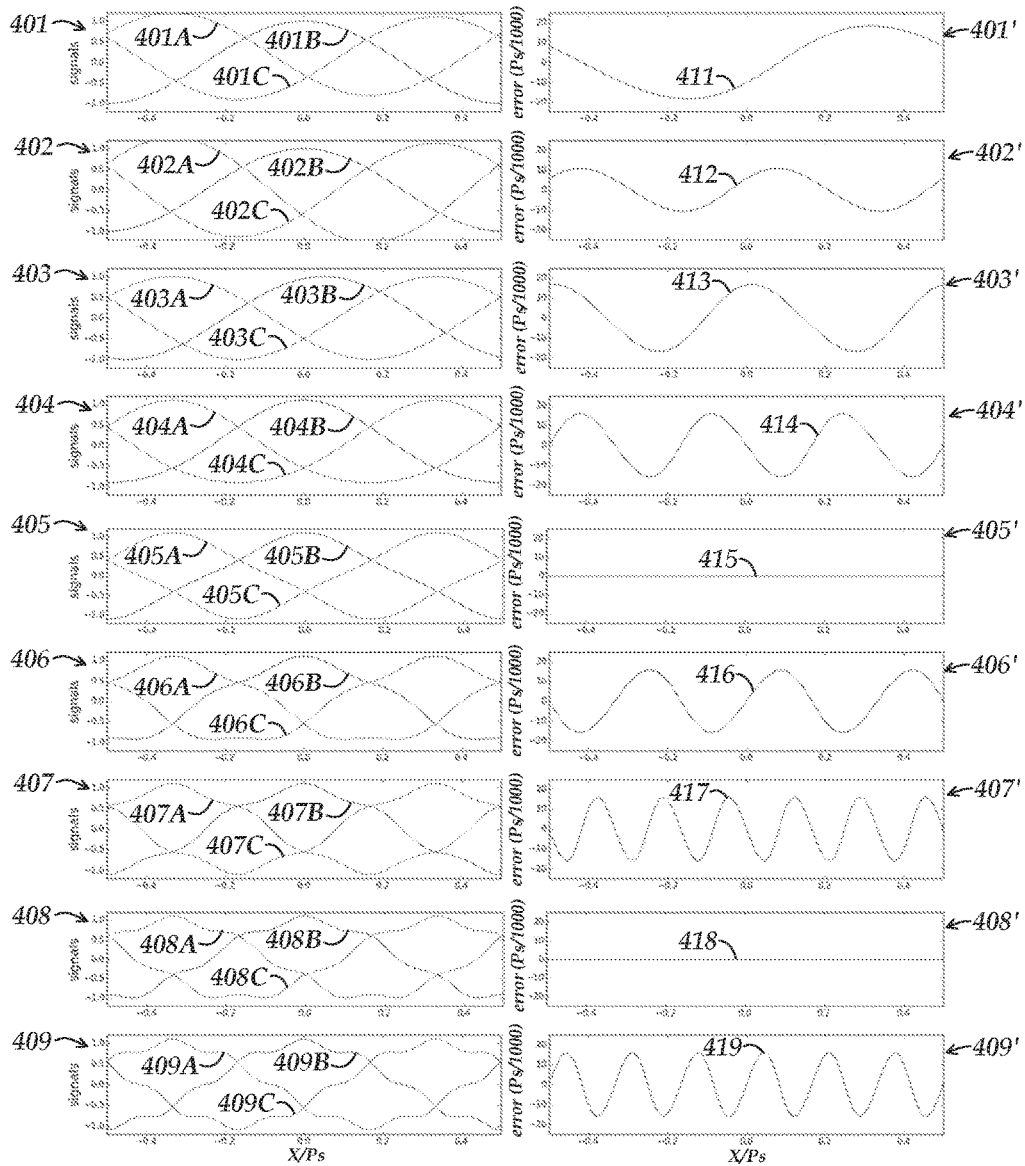
FIG. 4 shows graphs of detector signals from a single set of sensing elements of an electronic position encoder affected by various conditions, which are juxtaposed with corresponding graphs of the primary error component contributions resulting from those conditions.

FIG. 4 shows graphs of detector signals from a single set of sensing elements of a three phase electronic position encoder affected by various conditions as a function of a position X/Ps, which are juxtaposed with corresponding graphs of the primary error component contributions resulting from those conditions as a function of the position X/Ps, shown in units of Ps/1000, where Ps is the scale period. Each of the graphs of detector signals shows three phases as measured by a group of sensing elements in a three phase encoder such as the first group of sensing elements 231. Each of the graphs of error component contributions shows errors introduced after calculating a phase measurement using an arctangent function (e.g., as disclosed in the '387 patent). A graph 401 shows detector signals 401A, 401B and 401C, which are affected by an offset mismatch. A graph 401' shows an error component contribution 411 which is a first harmonic of a scale period Ps, which is a result of the offset mismatch. A graph 402 shows detector signals 402A, 402B and 402C, which are affected by an amplitude mismatch. A graph 402' shows an error component contribution 412 which is a second harmonic of the scale period Ps, which is a result of the amplitude mismatch. A graph 403 shows detector signals 403A, 403B and 403C, which are affected by a phase mismatch. A graph 403' shows an error component contribution 413 which is a second harmonic of the scale period Ps, which is a result of the phase mismatch. A graph 404 shows detector signals 404A, 404B and 404C, which are affected by a second harmonic component in the detector signals. A graph 404' shows an error component contribution 414 which is a third harmonic of the scale period Ps, which is a result of the second harmonic component in the detector signals 404A, 404B and 404C. A graph 405 shows detector signals 405A, 405B and 405C, which are affected by a third harmonic component in the detector signals. A graph 405' shows an error component contribution 415 which is naturally suppressed by using a single three phase set of sensing elements, and therefore has a constant zero value. A graph 406 shows detector signals 406A, 406B and 406C, which are affected by a fourth harmonic component in the detector signals. A graph 406' shows an error component contribution 416 which is a third harmonic of the scale period Ps, which is a result of the fourth harmonic component in the detector signals 406A, 406B and 406C. A graph 407 shows detector signals 407A, 407B and 407C, which are affected by a fifth harmonic component in the detector signals. A graph 407' shows an error component contribution 417 which is a sixth harmonic of the scale period Ps, which is a result of the fifth harmonic component in the detector signals 407A, 407B and 407C. A graph 408 shows detector signals 408A, 408B and 408C, which are affected by a sixth harmonic component in the detector signals. A graph 408' shows an error component contribution 418 which is naturally suppressed by using a single three phase set of sensing elements, and therefore has a constant zero value. A graph 409 shows detector signals 409A, 409B and 409C, which are affected by a seventh harmonic component in the detector signals. A graph 409' shows an error component contribution 419 which is a sixth harmonic of the scale period Ps, which is a result of the seventh harmonic component in the detector signals 409A, 409B and 409C In one implementation, a detector portion including two sets of sensing elements displaced at a distance equal to Ps/4 relative to one another (e.g., the detector portion 220) will suppress the error component contributions 412 and 413 resulting from amplitude and phase mismatch shown in graphs 402' and 403', as well error component contributions 417 and 419 shown in graphs 407' and 409' resulting from respective fifth and seventh harmonic components in detector signals.

In some implementations, in an electronic position encoder constructed according to the general principles disclosed herein, M may be equal to 4 and N may be equal to 3, the sensing elements may further comprise a third set of sensing elements and a fourth set of set of sensing elements, the third set of sensing elements may comprise three sensing elements arranged at three equally spaced phases of the scale period Ps and may be located at a group position which is displaced at a distance equal to K3*Ps+Ps/4 relative to the second set of sensing elements along the measuring axis direction, where K3 is an integer, the fourth set of sensing elements may comprise three sensing elements arranged at three equally spaced phases of the scale period Ps and may be located at a group position which is displaced at a distance equal to K4*Ps+Ps/4 relative to the third set of sensing elements along the measuring axis direction, where K4 is an integer, and the signal processing configuration 240 may be configured to independently acquire a third set of detector signals from the third set of sensing elements and a fourth set of detector signals from the fourth set of sensing elements and determine the relative position between the detector portion 220 and the scale pattern 211 based on the first, second, third and fourth set of detector signals. In general, a detector portion including M sets of sensing elements spaced K2*PS+Ps/M apart from each other (where K2 and A are integers) will suppress all harmonics of error component contributions except the A*M harmonic. Implementations using N=3 do not generate 4th and 8th harmonic error component contributions. Thus, an implementation comprising first, second, third and fourth sets of sensing elements (M=4) displaced a distance Ps/4 apart from one another and comprising three sensing elements (N=3) may suppress error component contributions up to a 12th harmonic error component contribution which corresponds to an 11th detector signal harmonic. It should be appreciated that an electronic position encoder configured according to the principles disclosed herein offers several advantages to known encoders. Pitch compensation such as that disclosed in the '990 patent is not necessary. Errors from amplitude mismatch, phase mismatch, signal drift, fifth harmonics, and seventh harmonics are suppressed. Offset mismatch errors are reduced.

There are a few tradeoffs for an electronic position encoder configured according to the principles disclosed herein. One or more additional arctangent calculations are necessary to provide a position measurement, which consumes more energy. One or more additional transmit and read cycles may be necessary, which also consumes more energy. Additional sensing elements are also required on a read head chip in order to provide a first group of sensing elements, a second group of sensing elements, and any additional groups of sensing elements, which requires a larger read head.

It should be appreciated, that an electronic position encoder configured according to the principles disclosed herein is not limited to inductive or eddy current sensing. An electronic position encoder may also be constructed for other sensing principles such as optical or capacitive sensing.

Figure 5:
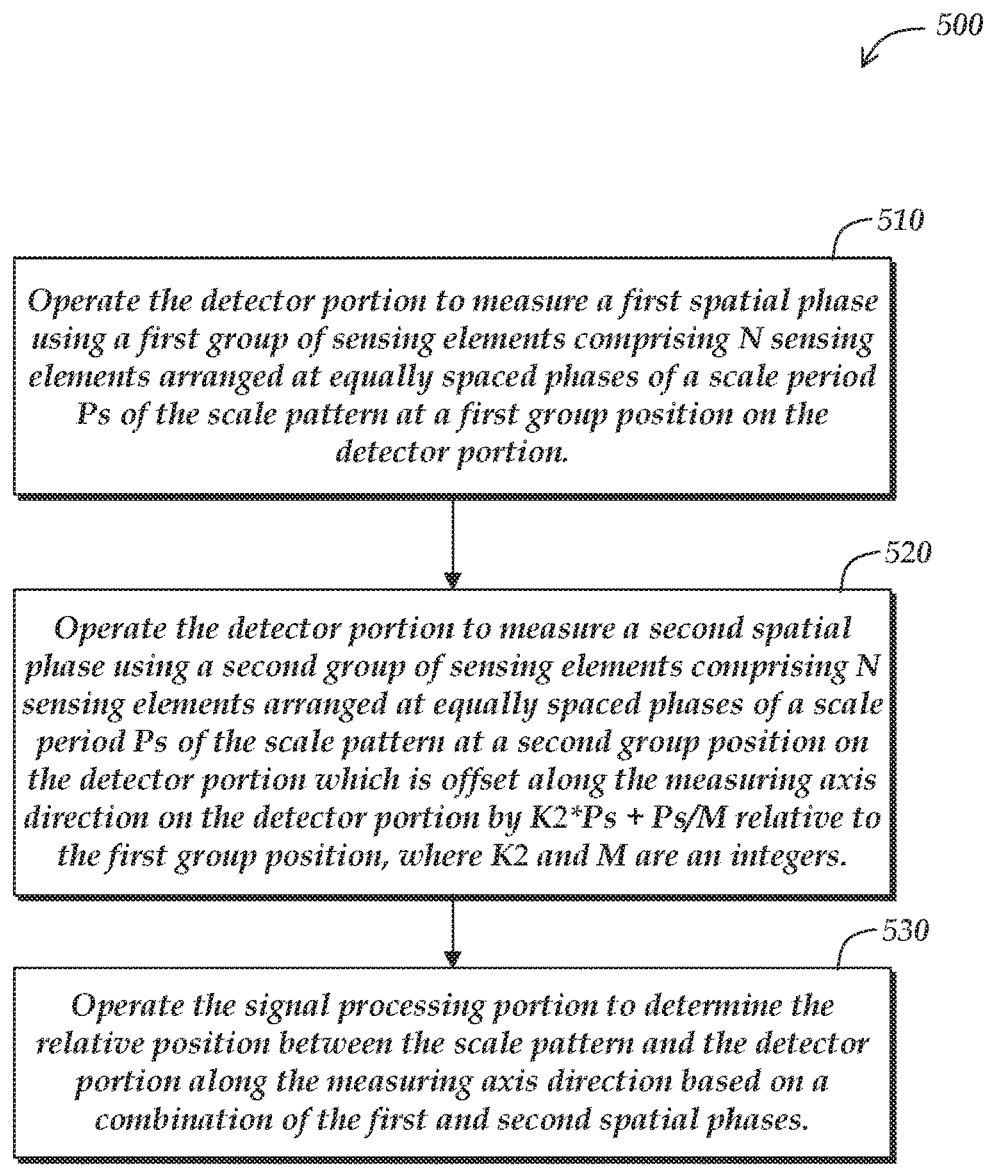
FIG. 5 is a diagram showing a method for reducing short range errors in determining a relative position measurement of a scale pattern relative to a detector portion along a measuring axis direction as measured by an electronic position encoder.

FIG. 5 is a flow diagram 500 showing a method for reducing short range errors in determining a relative position measurement of a scale pattern relative to a detector portion along a measuring axis direction as measured by an electronic position encoder.

At a block 510, the detector portion is operated to measure a first spatial phase using a first group of sensing elements comprising N sensing elements arranged at equally spaced phases of a scale period Ps of the scale pattern at a first group position on the detector portion.

At a block 520, the detector portion is operated to measure a second spatial phase using a second group of sensing elements comprising N sensing elements arranged at equally spaced phases of a scale period Ps of the scale pattern at a second group position on the detector portion which is offset along the measuring axis direction on the detector portion by K2*Ps+Ps/M relative to the first group position, where K2 and M are an integers.

At a block 530, the signal processing portion is operated to determine the relative position between the scale pattern and the detector portion along the measuring axis direction based on a combination of the first and second spatial phases.

In some implementations, operating the detector portion to determine the relative position between the scale pattern and the detector portion along the measuring axis direction may comprise summing the first spatial phase and the second spatial phase.

Various embodiments described above can be combined to provide further embodiments. All of the U.S. patents referred to in this specification are incorporated herein by reference, in their entirety. Aspects of the embodiments can be modified, if necessary to employ concepts of the various patents, to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled.

The invention claimed is:

1. An electronic position encoder usable to measure a relative position between two elements along a measuring axis direction, the electronic position encoder comprising:
   a scale extending along the measuring axis direction and including a periodic scale pattern along the measuring direction having a scale period Ps;
   a detector portion configured to be mounted proximate to the scale pattern and to move along the measuring axis direction relative to the scale pattern, the detector portion comprising:
      a plurality of sensing elements arranged along the measuring axis direction configured to provide detector signals which correspond to the relative position between the detector portion and the scale pattern; and
   a signal processing configuration that is operably connected to the detector portion that determines the relative position between the detector portion and the scale pattern based on detector signals input from the detector portion, wherein:
      the plurality of sensing elements comprises at least a first set of sensing elements and a second set of sensing elements;
      the first set of sensing elements comprises N sensing elements arranged at N equally spaced phases of the scale period Ps;
      the second set of sensing elements comprises N sensing elements arranged at N equally spaced phases of the scale period Ps;

the second set of sensing elements is located at a group position which is displaced at a distance equal to K2*Ps+Ps/M relative to the first set of sensing elements along the measuring axis direction, where K2 is an integer and M is an integer that is at least 2; and the signal processing configuration is configured to independently acquire a first set of detector signals from the first set of sensing elements and a second set of detector signals from the second set of sensing elements and determine the relative position between the detector portion and the scale pattern based on the first set of detector signals and the second set of detector signals.

2. The electronic position encoder of claim 1, wherein the signal processing configuration is configured to:

determine a first spatial phase of the periodic scale pattern relative to the first set of sensing elements based on the first set of detector signals;

determine a second spatial phase of the periodic scale pattern relative to the second set of sensing elements based on the second set of detector signals; and determine the relative position between the detector portion and the scale pattern based on a synthetic spatial phase which is a sum of the first spatial phase and the second spatial phase.

3. The electronic position encoder of claim 1, wherein the electronic position encoder is an absolute electronic position encoder comprising multiple scale tracks.

4. The electronic position encoder of claim 1, wherein the signal processing configuration comprises a preamplifier configured to receive multiplexed position signals from both the first set of sensing elements and the second set of sensing elements.

5. The electronic position encoder of claim 1, further comprising a first electronic connection between the first set of sensing elements and the signal processing configuration and a second electronic connection between the second set of sensing elements and the signal processing configuration, wherein the first electronic connection and the second electronic connection are symmetric relative to one another.

6. The electronic position encoder of claim 1, wherein:

M is equal to 4 and N is equal to 3;

the plurality of sensing elements further comprises a third set of sensing elements and a fourth set of set of sensing elements;

the third set of sensing elements comprises 3 sensing elements arranged at N equally spaced phases of the scale period Ps and is located at a group position which is displaced at a distance equal to K3*Ps+Ps/4 relative to the second set of sensing elements along the measuring axis direction, where K3 is an integer;

the fourth set of sensing elements comprises three sensing elements arranged at three equally spaced phases of the scale period Ps and is located at a group position which is displaced at a distance equal to K4*Ps+Ps/4 relative to the third set of sensing elements along the measuring axis direction, where K4 is an integer; and the signal processing configuration is configured to independently acquire a third set of detector signals from the third set of sensing elements and a fourth set of detector signals from the fourth set of sensing elements and determine the relative position between the detector portion and the scale pattern based on the first, second, third and fourth set of detector signals.

7. The electronic position encoder of claim 1, wherein the scale and the detector portion form one of an inductive position transducer or an eddy current transducer.

8. The electronic position encoder of claim 1, wherein M is one of 2, 3 or 4.

9. The electronic position encoder of claim 1, wherein the first set of sensing elements and the second set of sensing elements share at least one common sensing element.

10. The electronic position encoder of claim 9, wherein M is equal to 3 and N is equal to 3.

* * * * *